Feb. 28, 1967   TETSUO AOYAMA ETAL   3,307,170
MULTI-FACE INDICATOR SYSTEM
Filed Feb. 27, 1963   6 Sheets-Sheet 6
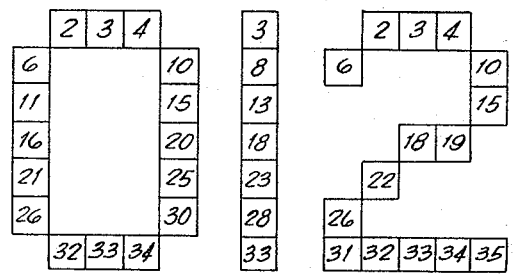
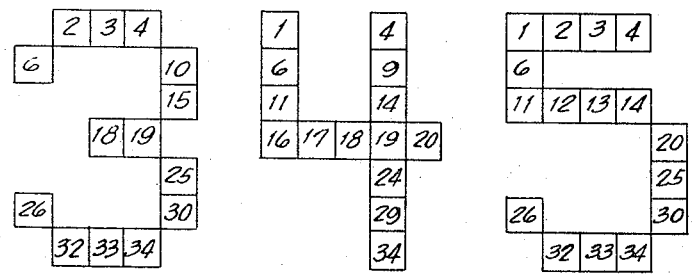
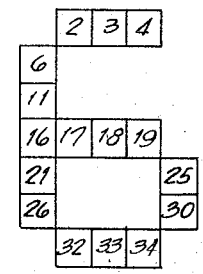
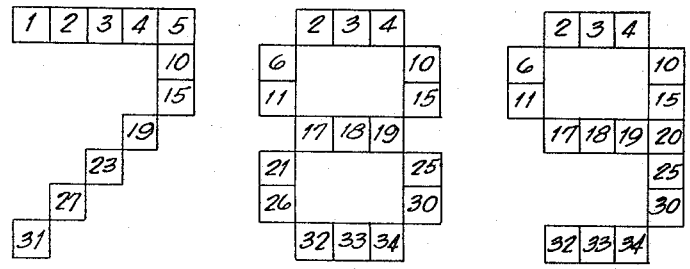
FIG. 9
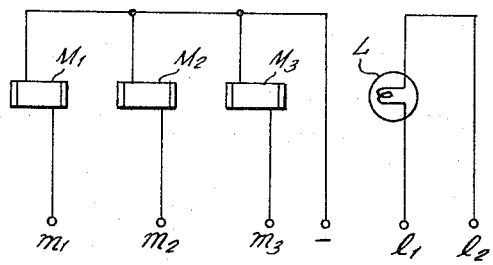
FIG. 9A
FIG. 10

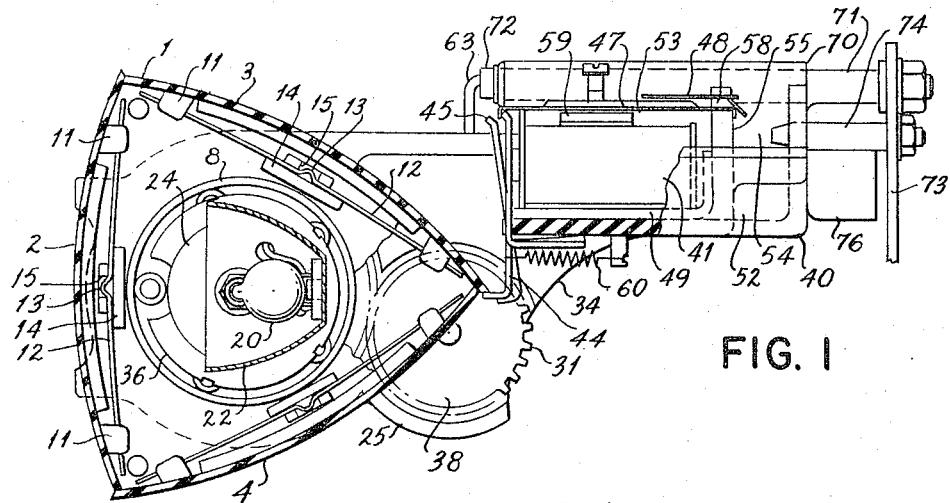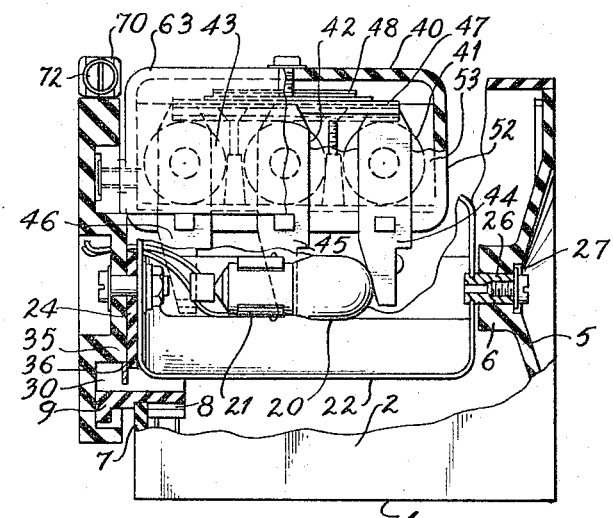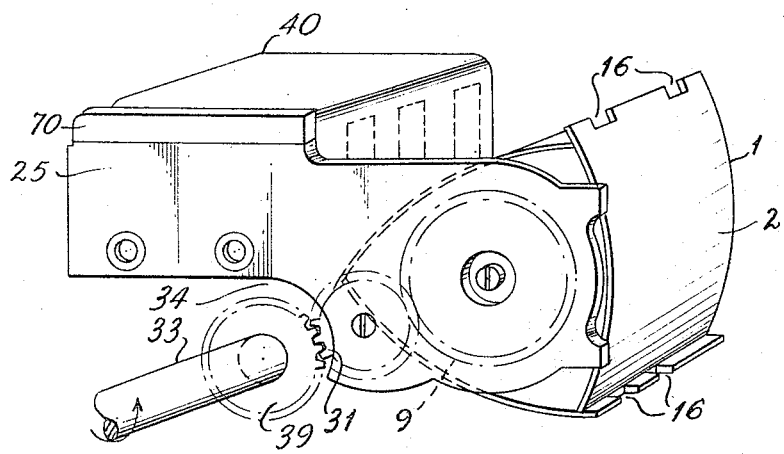

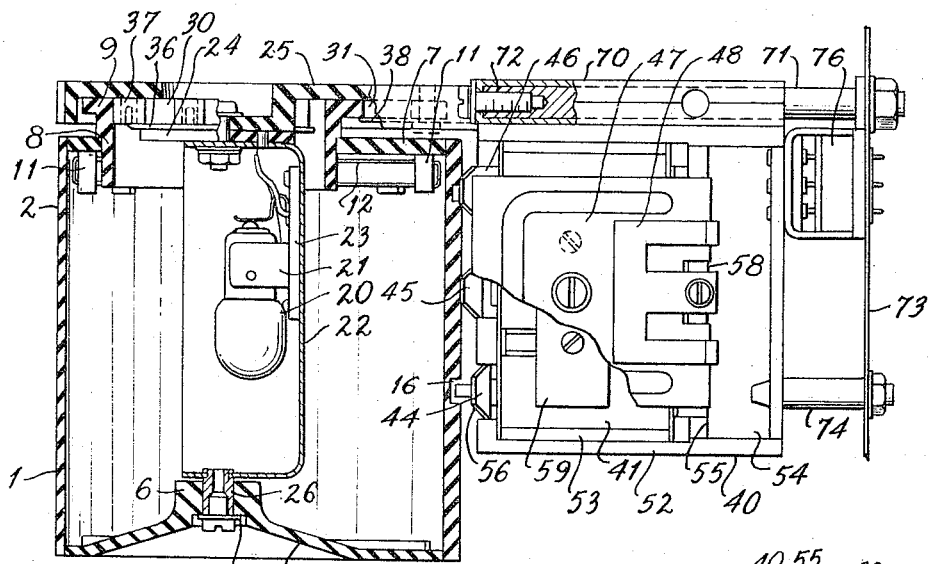
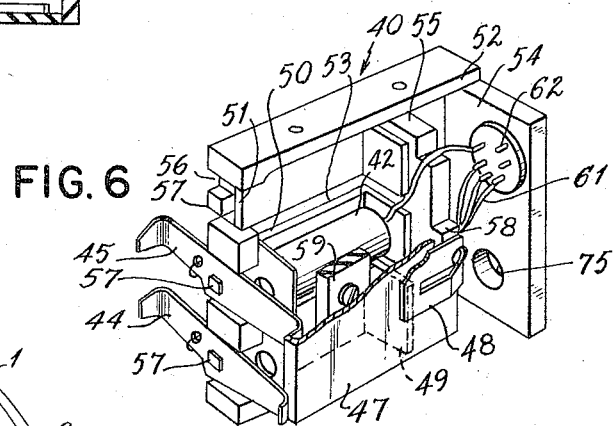
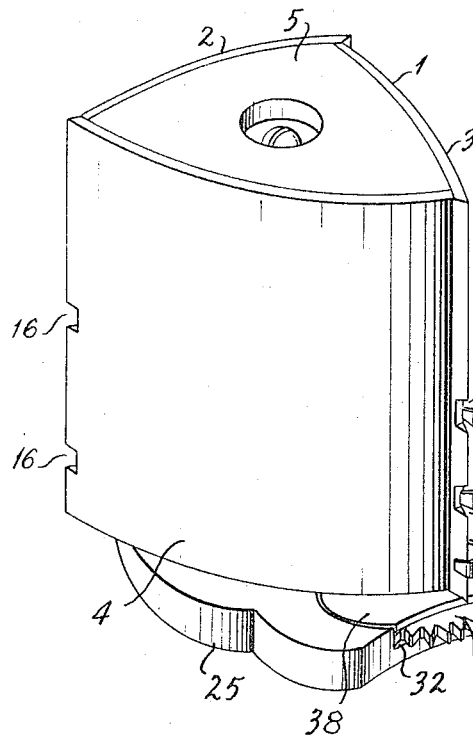

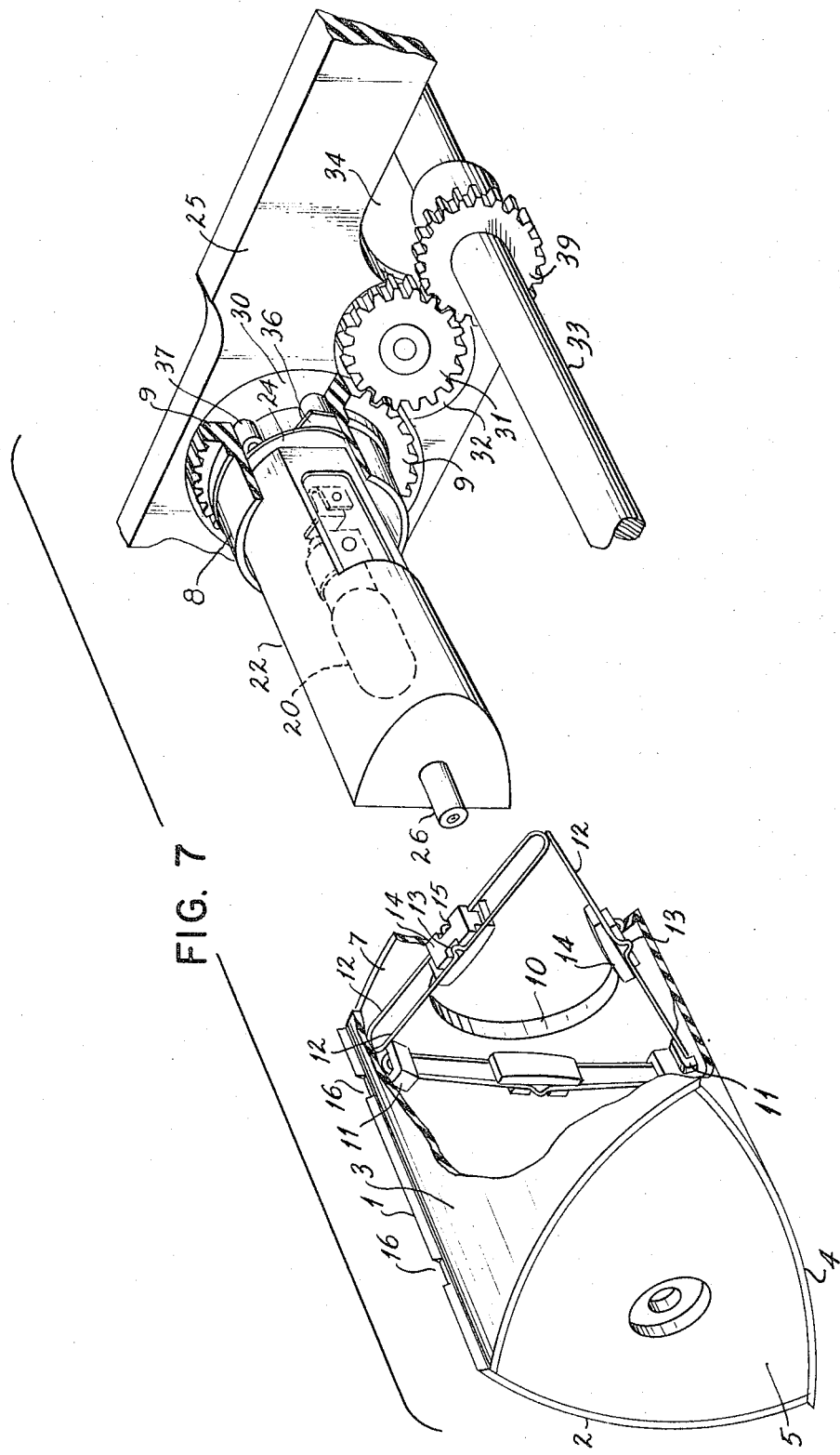

United States Patent Office 3,307,170
Patented Feb. 28, 1967

3,307,170
MULTI-FACE INDICATOR SYSTEM
Tetsuo Aoyama, Yokohama-shi, and Takeshi Teragaki, Kamakura-shi, Japan, assignors to Fujitsu Limited, Kawasaki, Japan, a corporation of Japan
Filed Feb. 27, 1963, Ser. No. 261,436
6 Claims. (Cl. 340—324)

This invention relates to a multi-face indicator which has a number of indicating faces of different color, any one of which may be moved selectively to one indicating position.

It is an object of our invention to provide a multi-face indicator in which any one indicating face can easily be brought to a designated indicating position.

Another object of our invention is to provide a multi-face indicator of simple construction composed of parts which can be simply manufactured and assembled.

Still another object of this invention is to provide an indicator which has more than one indicating face, each of a different color and which can be combined with other such indicators to form a numeral, letter, symbol or other pattern. According to an aspect of the invention each multi-face indicator is used as an element in a combination of a large number of such elements constituting a single indicating apparatus, the faces having desired colors being brought to the exposed positions of the respective elements in this indicating apparatus, so as to form a letter, symbol or pattern in one or more colors.

Still another object of this invention is to provide such a composite indicating apparatus which is simpler in construction as a whole, which minimizes electric power consumption, and reduces the expense of manufacture and maintenance.

The various features of novelty characterizing the invention will be pointed out in the claims. Other objects and advantages of the invention will become obvious from the following detailed description of embodiments of the invention when read in conjunction with the accompanying drawings wherein:

FIG. 1 is a side view, partly in section, of a three-face indicator embodying features of this invention;

FIG. 2 is a front view, partly in section, of the device in FIG. 1;

FIG. 3 is a top view, partly in section, of the device in FIG. 1;

FIG. 4 is a perspective view from a side of the device in FIG. 1;

FIG. 5 is a perspective view from another side of the device in FIG. 1;

FIG. 6 is a perspective view of the magnet assembly in the device of FIG. 1;

FIG. 7 is an exploded view, partly in section, of the device in FIG. 1;

FIG. 9 is a schematic diagram showing an example of the methods of indicating Arabic numerals 1 to 0 in the indicating apparatus shown in FIG. 8;

FIG. 9A is a color combination chart for the faces of the indicators; and

FIG. 10 is a schematic circuit diagram of the control circuit of the apparatus in FIGS. 1 to 7.

Figure 8:
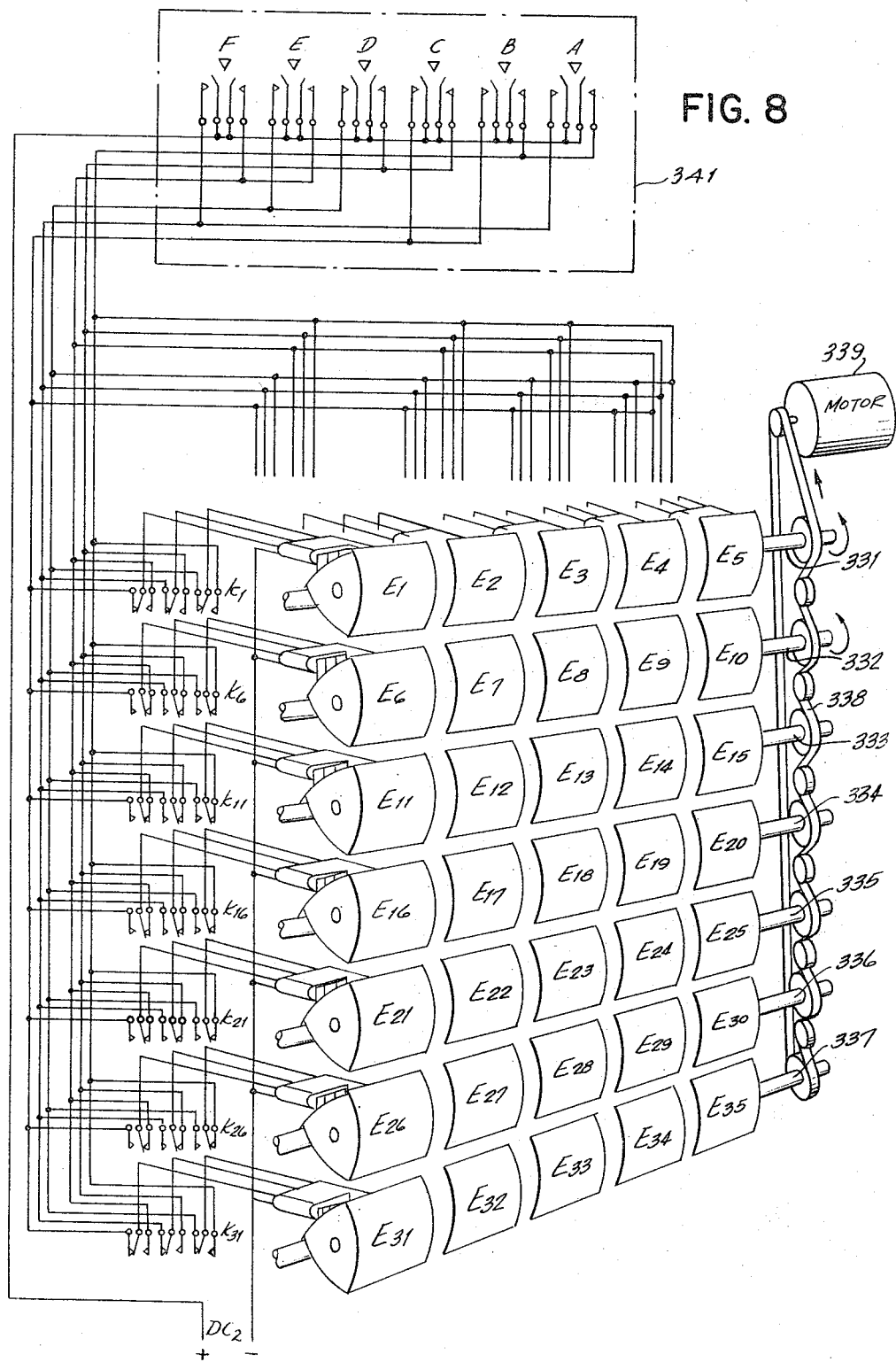
FIGS. 8 and 8A are partially schematic drawings of an assembly of devices corresponding to FIG. 1 with a control circuit altogether embodying features of the invention.

In FIGS. 1 to 7 an indicating cylinder or prism 1 possesses three convex indicating faces 2, 3 and 4 of different colors (see FIG. 7). The three indicating faces are made of translucent sheet material such as acrylic resin sheet, bent outwardly, and are painted, for example, red, blue and yellow. Secured at one end of indicating cylinder 1 is a concave end plate 5 (FIG. 3) having a central interior projection 6 constituting one of the supporting points for cylinder 1.

Secured on the other end of the cylinder 1 is a flat end plate 7 (FIG. 7) having, at its center a hole 10 for receiving the frictional cylinder portion 8 of a gear 9. Indicating faces 2, 3 and 4 each possess projections 11 on their insides at positions close to end plate 7 for supporting, together with the end plate 7, the ends of three springs 12 forming a triangle. Bent portions 13 at the center of each spring 12 support three frictional shoes 14 by means of respective notches 15, into which fit the bending portion of spring 12. The shoes 14 are pressed by spring 12 against the circumference of the frictional cylinder portion 8 of the gear 9. A recess 10 in end plate 7 on indicating cylinder 1 receives gear 9. The latter is held on the indicating cylinder elastically and presses against the three frictional shoes arranged at an equal interval on frictional cylinder portion 8. Gear 9 constitutes another support for indicating cylinder 1.

Mounted inside indicating cylinder 1 is a lamp 20 (FIG. 3) to furnish indicating light. A lamp holder 21, composed of plate springs, holds the lamp 20 and is in turn supported on a reflector or reflecting plate 22 by means of insulating plate 23. Reflecting plate 22 improves the effect of the indicating display and covers lamp 20 so as to cast beams only upon one indicating face at a time. Reflector 22 is screwed to a base 25 of the indicator in such a way as to secure it in a stationary position. Supporting shaft 26 for the indicating cylinder 1, affixed to one end of reflecting plate 22, fits into a bore in projection 6 of end plate 5. A washer 27 screwed to shaft 26 permits free rotation of cylinder or prism 1.

The base 25 for indicator 1 (FIG. 7) is made of plastic material such as hard vinyl chloride, molded into a form having a recess or depression 30 (FIGS. 2, 7) to receive gear 9, an intersecting recess 32 to receive gear 31, and a recess 34 to receive drive shaft 33 etc. A projection 35 within the recess 30 (FIG. 2) supports the aforesaid lamp holder 22 and fits into disc-shaped retainer 36. Gear 9 reposes in recess 30 when indicating cylinder 1 is supported on supporting shaft 26, and is supported to avoid eccentricity and to effect smoothness, while being interiorly guided by rollers 37 supported on retainer 36. Intermediate gear 31 in recess 32 is supported with screws and covered with protection plate 38 to prevent its falling off. This intermediate gear 31 engages the gear 9 and a gear 39 mounted on drive shaft 33, so as to transmit the rotation of driving shaft 33 to indicating cylinder 1 through the gear 9. That is to say, rotation of drive shaft 33 effects rotation of gear 9 through the gears 39 and 31. If indicating cylinder 1 is not restrained at this time, it also is rotated by virtue of the springs 12, frictional shoes 14 and frictional cylinder portion 8 of gear 9. If indicating cylinder 1 is restrained, the friction shoes 14 slip on friction cylinder portion 8 so that indicating cylinder 1 will not rotate despite rotation of drive shaft 33.

Connected to the indicator base 25 adjacent the indicating cylinder 1 (FIGS. 1 to 6) is a magnet mechanism portion or relay assembly 40. The latter comprises three electromagnets 41, 42 and 43 (FIGS. 2, 3, 6) and respectively armatures 44, 45 and 46 associated therewith, a common locking plate 47, a spring 48 for holding the locking plate in position, three L-shaped yokes 49, 50 and 51 belonging to the respective electromagnets, and a housing 52 containing these elements. Electromagnets 41, 42 and 43 include coils, side plates and iron cores, the accessory L-shaped yokes 49, 50 and 51 resting each in one block respectively. Each armature 44, 45 and 46 is made by punching a T-shape and bending it, and possesses a bent end for restraining indicating cylinder 1. The single locking plate 47 performs the function of retaining any one of the armatures 44, 45 and 46 in its actuated position until other armatures operate. The spring 48 is a spring plate made by punching a W-shape (FIG. 3) which biases the locking plate 47. The housing 52 preferably is molded of hard vinyl chloride into an integrated body having a space 53 for receiving the magnets and the yokes, space 54 for wiring, a wall portion 55 to separate the two spaces from each other, notches 56 for receiving the armatures, projections 57 for supporting the respective armatures, and projections 58 for supporting the spring 48. During assembly, the space 53 first receives the three yokes 49, 50 and 51, then magnets 41, 42 and 43, and yokes, a holding plate 59 securing all in position. The armatures 44, 45 and 46 interlock with notches 56 and projections 57. A restorer spring 60 elastically affixes the armatures to housing 52. Lead wires 61 in space 54 connect the coils of electromagnets 41, 42, 43 with pins of a plug 62 installed on the rear of housing 52. Space 53, containing the magnets and the yokes, is covered with the locking plate 47. Locking plate 47, one end of which is pressed against the wall portion 55 by holding spring 48, has its other end bent into a hook shape to engage the locking end of the three armatures 44, 45 and 46. Holding spring 48 is secured by a screw through its center leg to wall portion 55, and presses elastically on locking plate 47 with its outer legs. Magnet mechanism portion or relay assembly 40, thus composed, is secured to indicator base 25 by means of housing 52. A cover 63 protects its interior elements.

The indicator is mounted as follows. Indicator base 25 (FIGS. 1, 2, 3) has installation guide fittings 70 mounted on its side. An installation rod 71 is inserted in these fittings and is affixed to the fittings with screw 72. The installation rod 71 serves the purpose of installing the indicator on a panel 73. A guiding rod 74, mounted on panel 73, serves to secure the indicator. That is to say, when the indicator is to be installed, rod 74 serves as a guide as it fits in hole 75 in the installing side (rear side) of housing 52 of relay assembly 40. Also, the panel 73 possesses a socket 76 for electrical connection with the magnets 41, 42, 43.

The three-face indicator thus assembled can readily expose, as explained below, the indicating face, painted in the designated color, by moving it to the indicating position according to the input signal. Each of the three sides of indicating cylinder 1 has two notches 16 (FIG. 3) at a position corresponding to the positions of the ends an armatures 44, 45 or 46, with the three sides differing from one another in respect to the arrangement of the notches. Therefore, if any one of the three magnets 41, 42 and 43 in assembly 40 receives an input signal energizing the corresponding armature, for example 44, that armature is attracted, as shown in FIGS. 1, 3. If the indicator is now rotated clockwise, that face having no notch 16 in its edge at the position corresponding to this armature 44 will be caught by the bent free edge of the armature. This brings the desired indicating face, such as 2, to the indicating position. Then indicating cylinder 1 is restrained and stopped by armature 44 as shown in FIG. 1. When any armature, e.g., the aforesaid armature 44, starts operation, the operating armature 44 interlocks with the edge of locking plate 47 and remains interlocked until another armature starts operating. Another magnet, when it receives an input signal, attracts the corresponding armatures, with the result that locking plate 47 is pushed up and reelases the previously locked armature 44. Since there is no notch 16 at the position corresponding to the armature newly attracted at this time, indicating cylinder is rotated again until the corresponding indicating face reaches the indicating position, and is restrained and stopped by the newly actuated armature. Thus, with one of the three magnets receiving an input signal, it is possible to rotate any indicating face of the indicating cylinder to an indicating position.

FIG. 10 shows the electric connecting circuit of the three-face indicator shown in FIGS. 1 to 7. The three magnets 41, 42 and 43 are represented by $M_1$, $M_2$ and $M_3$, and lamp 20 by L, $m_1$, $m_2$ and $m_3$ indicating the input-signal supply terminals (−), the common ground terminal, and $l_1$ and $l_2$ the lamp terminals. When $l_1$ and $l_2$ carry current and light up the lamps, and when one of $m_1$, $m_2$ and $m_3$ is supplied with an input signal, as stated, the desired indicating face appears at the indicating position of the three-face indicator.

The three-face indicator shown in FIGS. 1 to 7 can be used alone to accomplish simple display. However, the invention also contemplates using such three-face indicators as elements in an apparatus to indicate numerals, letters, symbols and patterns. Since the three indicating faces of the three-face indicator are painted in colors different from one another, the faces may constitute the elements of a mosaic pattern forming a display of symbols in one or two colors on a two or one-color background, or by changing the colors of the background, the symbol, or both.

Figure 8A:
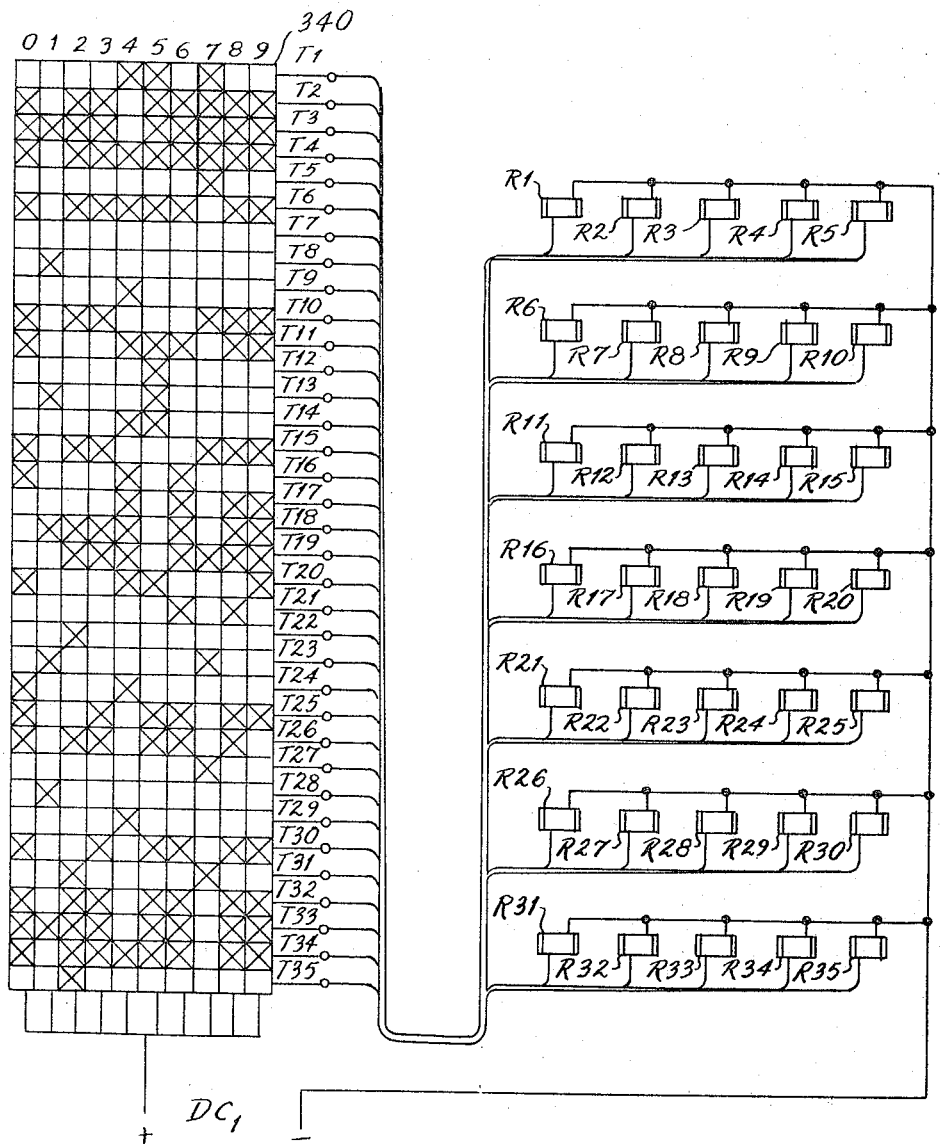

FIG. 8 shows an example of an indicating apparatus comprising 35 such individual three-face indicators arranged to form a mosaic pattern together with part of a controlling circuit. FIG. 9 illustrates by way of example the method of presenting Arabic numerals 1 to 0 with the indicating apparatus shown in FIG. 8. FIG. 8A is a block diagram of the relay circuits controlling the contacts of FIG. 8. It is possible to use a combination of a large number of three-face indicators in order to indicate more complicated symbols or patterns.

FIG. 8 omits such elements of the indicating apparatus as the yokes, frame and panel to simplify the drawing and shows only a simplified arrangement of the 35 three-face indicators and their mechanical connection with the driving motor.

In FIG. 8 a motor 339 drives a plurality of shafts 331, 332, 333, 334, 335, 336, 337 by means of respective pulleys. The shafts correspond in function to the shaft 33 in FIGS. 1 to 7 and rotate the respective friction cylinders 8 in seven sets of indicators $E_1$ to $E_5$, $E_6$ to $E_{10}$, $E_{11}$ to $E_{15}$, $E_{16}$ to $E_{20}$, $E_{21}$ to $E_{25}$, $E_{26}$ to $E_{30}$, and $E_{31}$ to $E_{35}$, each indicator corresponding to the indicators described in FIGS. 1 to 7. Each indicator $E_1$ to $E_{35}$ connects to a set of three contacts jointly designated, in corresponding order, $k_1$ to $k_{35}$ on respective relays $R_1$ to $R_{35}$ (see FIG. 8A). (Only contacts $k_1$, $k_6$, $k_{11}$, $k_{16}$, $k_{21}$, $k_{26}$, $k_{31}$ are shown.) A letter-formation combining device 340 connects to the respective relays and controls them so that if any numeral is to be indicated by the indicator the correct relay coils are energized from a source $DC_1$. The device 340 includes switches, a number of which are actuated for each digit to be indicated.

For the digit 0 to be indicated, the 0 is selected by an incoming signal which will in turn close those switches that will produce outputs at terminals $T_2$, $T_3$, $T_4$, $T_6$, $T_{10}$, $T_{11}$, $T_{15}$, $T_{16}$, $T_{20}$, $T_{21}$, $T_{25}$, $T_{26}$, $T_{30}$, $T_{32}$, $T_{33}$ and $T_{34}$. The switches closed correspond to the spaces marked X in the column under each digit in the device 340. The relays corresponding to the terminals having signals will now energize the corresponding contacts. Thus all three contacts in $k_2$, $k_3$, $k_4$, $k_6$, $k_{10}$, $k_{14}$, $k_{15}$, $k_{16}$, $k_{20}$, $k_{21}$, $k_{25}$, $k_{26}$, $k_{30}$, $k_{32}$, $k_{33}$ and $k_{34}$ are actuated in one direction. The remaining contacts rest in their normal position.

A color combination selector 341 selects which one of the three switches in the actuated sets of contacts will conduct current to their armatures on the indicators, and which one of the three switches in the unactuated sets of contacts will conduct current from a source $DC_2$. The color combination selector device 341 comprises six push-button switches, which thereby selects the colors of the background and the digit. The pattern of color combination for each pushbutton is shown in the chart of FIG. 9A. The device 341 can also comprise a relay system which receives remote input signals and makes the desired circuit connection, or other known circuit, instead of a combination of pushbutton switches. For effective indication, the invention contemplates using a color combination device to receive clock pulses from a clock device so as to change the color of the background or the letter form, or both. Different background colors may be selected for different successive letters or digits. The device 341 connects to the switches $k_1$ to $k_3$ to select suitable combinations.

The indicating apparatus shown in FIGS. 8 and 8A performs as follows: When, for example, the letter forming combination device 340 is actuated to indicate numeral "0," a switching device actuates all the switches marked X in the 0 column of device 340. These switches then actuate the corresponding relays $R_1$ to $R_{35}$. Now if pushbutton switch A, for example, is operated in the color combination selector device, the first magnets of the three-face indicators corresponding to the contacts on the relays which were energized by the zero selection receive signals. This is shown from the condition of contacts $k_6$, $k_{11}$, $k_{16}$, $k_{21}$ and $k_{26}$. The three-face indicators actuated by the 0 selector now turn their red color faces to the indicating position. The three-face indicators corresponding to the relays which did not operate selectively, on the other hand, display the yellow, second indicating face, for example, at the indicating position, forming a yellow background.

In FIG. 8, since numeral "0" is selected in the letter forming combination device, three-face indicators $E_2$, $E_3$, $E_4$, $E_6$, $E_{10}$, $E_{11}$, $E_{16}$, $E_{21}$, $E_{25}$, $E_{26}$, $E_{30}$, $E_{32}$, $E_{33}$ and $E_{34}$ display their red, first, indicating faces, these indications as a whole forming red numeral "0," while the other three-face indicators have the yellow, second indicating faces retained at the indicating position thereby forming a yellow background. In the same way, numerals "1" to "9" in the other place are formed and indicated as shown in FIG. 9.

Combination of the colors of letters and ground is selected by the pushbutton switch of the color combination device. When pushbutton switch A is closed, the letter is formed by the red, first indicating face, and the background color by the yellow, second indicating face. If pushbutton switch B is closed, the letter is formed by the red, first indicating face, and the background color by the blue, third indicating face. Similarly, if one of the other bushbutton switches C, D, E and F is closed, the desired numeral can be indicated by the combination as shown in the chart of FIG. 9A.

The foregoing examples embody features of this invention. The scope of application of this invention, however, is not limited to these examples. For instance, in the illustrated examples embodying the features of the invention, the rotation of the indicating cylinder is transmitted by the common driving shaft coupled with the motor. Instead of this method, however, it is possible to attach a driving motor to each indicator so that the motor may be driven only when the indicating cylinder is to be driven. Adoption of such a means of driving makes it advantageous to compose an indicating apparatus with a relatively small number of indicators or an indicating apparatus using only one indicator independently.

The indicating cylinder or prism need not be a triangular cylinder but may be a polygonal having a larger number, such as 4, 5 or 6, of indicating faces. In this case, there is no need to change the method of control. Only the number of magnets and accessory armatures, yokes, etc. in the magnet mechanism portion need correspond the type of the cylinder. The indicator, whose indicating cylinder is a many-sided cylinder having a larger number of indicating faces, can indicate colors of a wider variety of combination.

The invention is not limited to the combination of the multi-face indicators shown in FIGS. 8 and 8A. The indicating apparatus shown in FIGS. 8 and 8A simply selects and indicates one-digit Arabic numerals. It will be understood, however, that a combination of a larger number of indicators can furnish an apparatus capable of indicating letters and symbols in addition to numerals. It is also possible to make color indications not only of letters and symbols but also of complicated drawings and patterns such as trade marks and patterns for advertisement. Even in the indicatting apparatus shown in FIGS. 8 and 8A, as already stated, a wide variety of indication control is accomplished if appropriate means are adopted in the letter form and the color combination device.

We claim:

1. A multi-face indicator comprising stationary mounting means, a prismatic structure rotatable on said mounting means, said prismatic structure having a plurality of faces each of a different color and overlapping each other to form laterally extending edges and a plurality of notches formed in said edges at different lateral positions, driving means for rotating said prismatic structure, an electromagnet assembly having a plurality of electromagnets and armatures, each of said armatures having a release and a locking position depending upon the energization of the corresponding electromagnet, each armature passing through determined ones of the notches in the edges of the faces of said prismatic structure and engaging in its locking position a determined one of the edges of said prismatic structure thereby arresting said prismatic structure in a desired position wherein one of its faces is positioned as desired when a corresponding one of said electromagnets is energized, the edges of said faces and said armatures being shaped and the notches formed in said edges being positioned so that each armature can engage only one edge, circuit means connected to said electromagnets for selectively placing one of said armatures into its locking position and the other armatures in the release position and locking plate means in operative proximity with said armatures for maintaining the armature of an energized electromagnet in position until another one of said electromagnets is energized.

2. A multi-face indicator comprising stationary mounting means, a hollow prismatic structure rotatable on said mounting means, said prismatic structure having a plurality of translucent faces each of a different color and overlapping each other to form laterally extending edges and a plurality of notches formed in said edges at different lateral positions, driving means for slippingly rotating said prismatic structure, and an electromagnet assembly having a plurality of electromagnets and armatures, each of said armatures having a release and a locking position depending upon the energization of the corresponding electromagnet, each armature passing through determined ones of the notches in the edges of the faces of said prismatic structure and engaging in its locking position a determined one of the edges of said prismatic structure thereby arresting said prismatic structure in a desired position wherein one of its faces is positioned as desired when a corresponding one of said electromagnets is energized, the edges of said faces and said armatures being shaped and the notches formed in said edges being positioned so that each armature can engage only one edge, circuit means connected to said electromagnets for selectively placing one of said armatures into its locking position and the other armatures in the release position, a lamp extending into said structure and locking plate means in operative proximity with said armatures for maintaining the armature of an energized electromagnet in position until another one of said electromagnets is energized.

3. A multi-face indicator comprising stationary mounting means, a prismatic structure rotatable on said mounting means, said prismatic structure having a plurality of faces each of a different color and overlapping each other to form laterally extending edges and a plurality of notches formed in said edges at different lateral positions, driving means for rotating said prismatic structure, and an electromagnet assembly having a plurality of electromagnets and armatures, each of said armatures having a lease and a locking position depending upon the energization of the corresponding electromagnet, each armature passing through determined ones of the notches in he edges of the faces of said prismatic structure and ngaging in its locking position a predetermined one of the edges of said prismatic structure thereby arresting aid prismatic structure in a desired position wherein one of its faces is positioned as desired when a corresponding one of said electromagnets is energized, the edges of said aces and said armatures being shaped and the notches ormed in said edges being positioned so that each armature can engage only one edge, and circuit means connected to said electromagnets for selectively placing one of said armatures into its locking position and the other armatures in the release position, said mounting means including a molded form defining a recess for receiving said electromagnet assembly and at least a portion of said circuit means, said mounting means including a second molded form defining a depression for receiving a portion of said driving means and locking plate means in operative proximity with said armature for maintaining the armature of an energized electromagnet in position until another one of said electromagnets is energized.

4. An indicating apparatus comprising a plurality of adjacent multi-face indicators, stationary mounting means for said indicators, each indicator including a rotatable prismatic structure having a plurality of faces of different color and overlapping each other to form laterally extending edges and a plurality of notches formed in said edges at different lateral positions, driving means for independently rotating said prismatic structures, an electromagnet assembly having a plurality of electromagnets and armatures, each of said armatures having a release and a locking position depending upon the energization of the corresponding electromagnet, each armature passing through determined ones of the notches in the edges of the faces of said prismatic structure and engaging in its locking position a determined one of the edges of said prismatic structure thereby arresting said prismatic structure in a desired position wherein a selected one of its faces is positioned as desired when a corresponding one of said electromagnets is energized, the edge of said faces and said armatures being shaped and the notches formed in said edges being positioned so that each armature can engage only one edge of each of said prismatic structures, circuit means connected to said electromagnets for selectively placing one of said armatures into its locking position and the other armatures in the release position, the selected one face of each indicator being the same, said selected faces together substantially forming a single plane, a master control interconnecting said circuit means for forming a system selectively actuating only predetermined ones of said electromagnets in said indicators, said master control including color selecting means for selecting faces of a desired color and locking plate means in operative proximity with said armatures for maintaining the armature of an energized electromagnet in position until another one of said electromagnets is energized.

5. An indicating apparatus comprising a plurality of adjacent multi-face indicators, stationary mounting means for said indicators, each indicator including a rotatable prismatic structure of triangular prismatic configuration having a plurality of convex rounded faces of different color and overlapping each other to form laterally extending edges and a plurality of notches formed in said edges at different lateral positions, driving means for independently rotating said prismatic structures, an electromagnet assembly having a plurality of electromagnets and armatures, each of said armatures having a release and a locking position depending upon the energization of the corresponding electromagnet, each armature passing through determined ones of the notches in the edges of the faces of said prismatic structure and engaging in its locking position a determined one of the edges of said prismatic structure thereby arresting said prismatic structure in a desired position wherein a selected one of its faces is positioned as desired when a corresponding one of said electromagnets is energized, the edges of said faces and said armatures being shaped and the notches formed in said edges being positioned so that each armature can engage only one edge of each of said prismatic structures, circuit means connected to said electromagnets for selectively placing one of said armatures into its locking position and the other armatures in the release position, the selected one face of indicator being the same, said selected faces together substantially forming a single plane a master control interconnecting said circuit means for forming a system selectively actuating only predetermined ones of said electromagnets in said indicators, said master control including color selecting means for selecting faces of a desired color and locking plate means in operative proximity with said armatures for maintaining the armature of an energized electromagnet in position until another one of said electromagnets is energized.

6. A multi-face indicator as claimed in claim 1, wherein said prismatic structure is a triangular prism and the faces thereof are convex rounded.

References Cited by the Examiner
UNITED STATES PATENTS

| | | | |
|---|---|---|---|
| 1,067,248 | 7/1913 | Hutchinson | 340—154 |
| 1,923,523 | 8/1933 | Whitney. | |
| 2,466,776 | 4/1949 | May | 192—142 |
| 3,009,134 | 11/1961 | Brosh. | |
| 3,140,553 | 7/1964 | Taylor. | |

NEIL C. READ, *Primary Examiner.*

A. J. KASPER, *Assistant Examiner.*